United States Patent
Mason et al.

(10) Patent No.: US 9,780,623 B2
(45) Date of Patent: Oct. 3, 2017

(54) COMPACT GASIFIER-GENSET ARCHITECTURE

(71) Applicant: All Power Labs, Inc., Berkeley, CA (US)

(72) Inventors: James Matthew Mason, Berkeley, CA (US); Bear Kaufmann, Berkeley, CA (US); Nick Bindbeutel, Berkeley, CA (US); Julia Hasty, Berkeley, CA (US); Ariel Fisk-Vittori, Berkeley, CA (US)

(73) Assignee: All Power Labs, Inc., Berkeley, CA (US)

( * ) Notice: Subject to any disclaimer, the term of this patent is extended or adjusted under 35 U.S.C. 154(b) by 0 days.

(21) Appl. No.: 15/281,459

(22) Filed: Sep. 30, 2016

(65) Prior Publication Data

US 2017/0018996 A1 Jan. 19, 2017

Related U.S. Application Data

(63) Continuation of application No. 14/452,325, filed on Aug. 5, 2014, now Pat. No. 9,476,352, which is a
(Continued)

(51) Int. Cl.
*F02B 63/04* (2006.01)
*H02K 7/18* (2006.01)
(Continued)

(52) U.S. Cl.
CPC .......... *H02K 7/1815* (2013.01); *C10B 53/02* (2013.01); *C10J 3/26* (2013.01); *C10J 3/64* (2013.01);
(Continued)

(58) Field of Classification Search
CPC .......... H02K 7/1815; H02K 7/18; F02C 7/22; F02C 7/20; C10K 1/02; C10B 53/02;
(Continued)

(56) References Cited

U.S. PATENT DOCUMENTS

| 4,278,064 A | 7/1981 | Regueiro |
| 4,488,364 A | 12/1984 | Herschel |

(Continued)

FOREIGN PATENT DOCUMENTS

| CN | 1277339 A | 12/2000 |
| EP | 0091991 A | 10/1983 |

(Continued)

*Primary Examiner* — Javaid Nasri
(74) *Attorney, Agent, or Firm* — Jeffrey Schox; Diana Lin

(57) ABSTRACT

A compact biomass gasification-based power generation system that converts carbonaceous material into electrical power, including an enclosure that encases: a gasifier including a pyrolysis module coaxially arranged above a reactor module, a generator including an engine and an alternator, and a hopper. The generator system additionally includes a first heat exchanger fluidly connected to an outlet of the reactor module and thermally connected to the drying module, a second heat exchanger fluidly connected to an outlet of the engine and thermally connected to the pyrolysis module, and a third heat exchanger fluidly connected between the outlet of the reactor module and the first heat exchanger, the third heat exchanger thermally connected to an air inlet of the reactor module. The system can additionally include a central wiring conduit electrically connected to the pyrolysis module, reactor module, and engine, and a control panel connected to the conduit that enables single-side operation.

20 Claims, 7 Drawing Sheets

Related U.S. Application Data continuation of application No. 13/833,918, filed on Mar. 15, 2013, now Pat. No. 8,829,695.

(60) Provisional application No. 61/617,658, filed on Mar. 29, 2012.

(51) Int. Cl.

| | | |
|---|---|---|
| *F02B 43/08* | (2006.01) | |
| *F02D 19/06* | (2006.01) | |
| *F16N 9/04* | (2006.01) | |
| *C10J 3/26* | (2006.01) | |
| *C10J 3/66* | (2006.01) | |
| *C10K 1/02* | (2006.01) | |
| *C10B 53/02* | (2006.01) | |
| *F02C 7/20* | (2006.01) | |
| *F02C 7/22* | (2006.01) | |
| *C10J 3/64* | (2006.01) | |

(52) U.S. Cl.
CPC ................ *C10J 3/66* (2013.01); *C10K 1/02* (2013.01); *F02B 43/08* (2013.01); *F02B 63/04* (2013.01); *F02C 7/20* (2013.01); *F02C 7/22* (2013.01); *F02D 19/0671* (2013.01); *F16N 9/04* (2013.01); *C10J 2200/00* (2013.01); *C10J 2200/158* (2013.01); *C10J 2200/31* (2013.01); *C10J 2300/093* (2013.01); *C10J 2300/0909* (2013.01); *C10J 2300/0916* (2013.01); *C10J 2300/0956* (2013.01); *C10J 2300/165* (2013.01); *C10J 2300/1869* (2013.01); *C10J 2300/1876* (2013.01); *Y02E 50/14* (2013.01); *Y02P 20/129* (2015.11); *Y02T 10/32* (2013.01); *Y02T 10/36* (2013.01)

(58) Field of Classification Search
CPC ........ F02D 19/0671; F16N 9/04; F02B 63/04; F02B 43/08; C10J 2200/00; C10J 2300/093; C10J 3/64; C10J 3/26; C10J 3/66; C10J 2200/31; C10J 2300/165; C10J 2300/0909; C10J 2200/158; C10J 2300/1876; C10J 2300/1869; C10J 2300/0916; C10J 2300/0956; Y02P 20/129; Y02T 10/36; Y02T 10/32; Y02E 50/14

USPC .................. 290/1 A, 1 R, 2; 60/648, 39, 12
See application file for complete search history.

(56) References Cited

U.S. PATENT DOCUMENTS

| | | |
|---|---|---|
| 5,393,315 A | 2/1995 | Alliston et al. |
| 6,039,774 A | 3/2000 | Mcmullen et al. |
| 6,112,677 A | 9/2000 | Kuntschar et al. |
| 6,398,921 B1 | 6/2002 | Moraski |
| 8,344,528 B2 | 1/2013 | Bassett |
| 8,764,857 B2 * | 7/2014 | Mason ........................ C10J 3/26 48/61 |
| 8,829,695 B2 | 9/2014 | Mason et al. |
| 9,476,352 B2 * | 10/2016 | Mason .................... F02B 63/04 |
| 2004/0111968 A1 | 6/2004 | Day et al. |
| 2005/0109603 A1 | 5/2005 | Graham |
| 2005/0247553 A1 | 11/2005 | Ichikawa et al. |
| 2006/0265954 A1 | 11/2006 | Dogru et al. |
| 2007/0006528 A1 | 1/2007 | Diebold et al. |
| 2007/0089367 A1 | 4/2007 | Goddard |
| 2007/0111051 A1 | 5/2007 | Muradov |
| 2007/0220805 A1 | 9/2007 | Leveson et al. |
| 2007/0220810 A1 | 9/2007 | Leveson et al. |
| 2007/0245934 A1 | 10/2007 | Carman |
| 2009/0239279 A1 | 9/2009 | Hall et al. |
| 2010/0043291 A1 | 2/2010 | Ljunggren |
| 2011/0023363 A1 | 2/2011 | Mason |
| 2013/0264831 A1 | 10/2013 | Mason |

FOREIGN PATENT DOCUMENTS

| | | |
|---|---|---|
| EP | 2145939 A | 1/2010 |
| EP | 2374863 A | 10/2011 |
| NO | 2008073021 A1 | 6/2008 |

* cited by examiner

COMPACT GASIFIER-GENSET ARCHITECTURE

CROSS-REFERENCE TO RELATED APPLICATIONS

This application is a continuation of U.S. patent application Ser. No. 14/452,325 filed 5 Aug. 2014, now U.S. Pat. No. 9,476,352, which is a continuation of U.S. patent application Ser. No. 13/833,918 filed 15 Mar. 2013, now U.S. Pat. No. 8,829,695, which claims benefit to U.S. Provisional No. 61/617,658 filed 29 Mar. 2012, all of which are incorporated in their entirety by this reference.

This application is related to U.S. patent application Ser. No. 12/846,807, filed 29 Jul. 2010 and titled "SYSTEM AND METHOD FOR DOWNDRAFT GASIFICATION," which is incorporated in its entirety by this reference.

TECHNICAL FIELD

This invention relates generally to the power generation field, and more specifically to an improved biomass gasification based power generator in the power generation field.

BACKGROUND

Biomass gasification based generators are an attractive method for power generation, given they are fueled with carbonaceous byproducts that are inexpensive or free to source. However, conventional biomass gasifiers are often large, sprawling assemblies, preventing consumer adoption due to their significant footprint, complexity of operation, and difficult transport logistics. What is desired is a complete and compact biomass power generation system in a single box enclosure, in the manner typical of a liquid-fueled genset, such as a diesel or LPG generator. However, it is difficult to achieve this configuration with a gasifier genset given the significant number of components involved, the large hopper required for low energy density biomass, and the complexity of solid fuel feeding systems. Until these problems are solved, very few biomass gasification based generators will be deployed, and their many potential benefits will not be realized. Therefore, there is a need in the biomass gasification generator field to create an improved, fully integrated, and compact system that meets user expectations for contemporary power generation equipment.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Gasifier-Engine Generator System

Figure 1A:
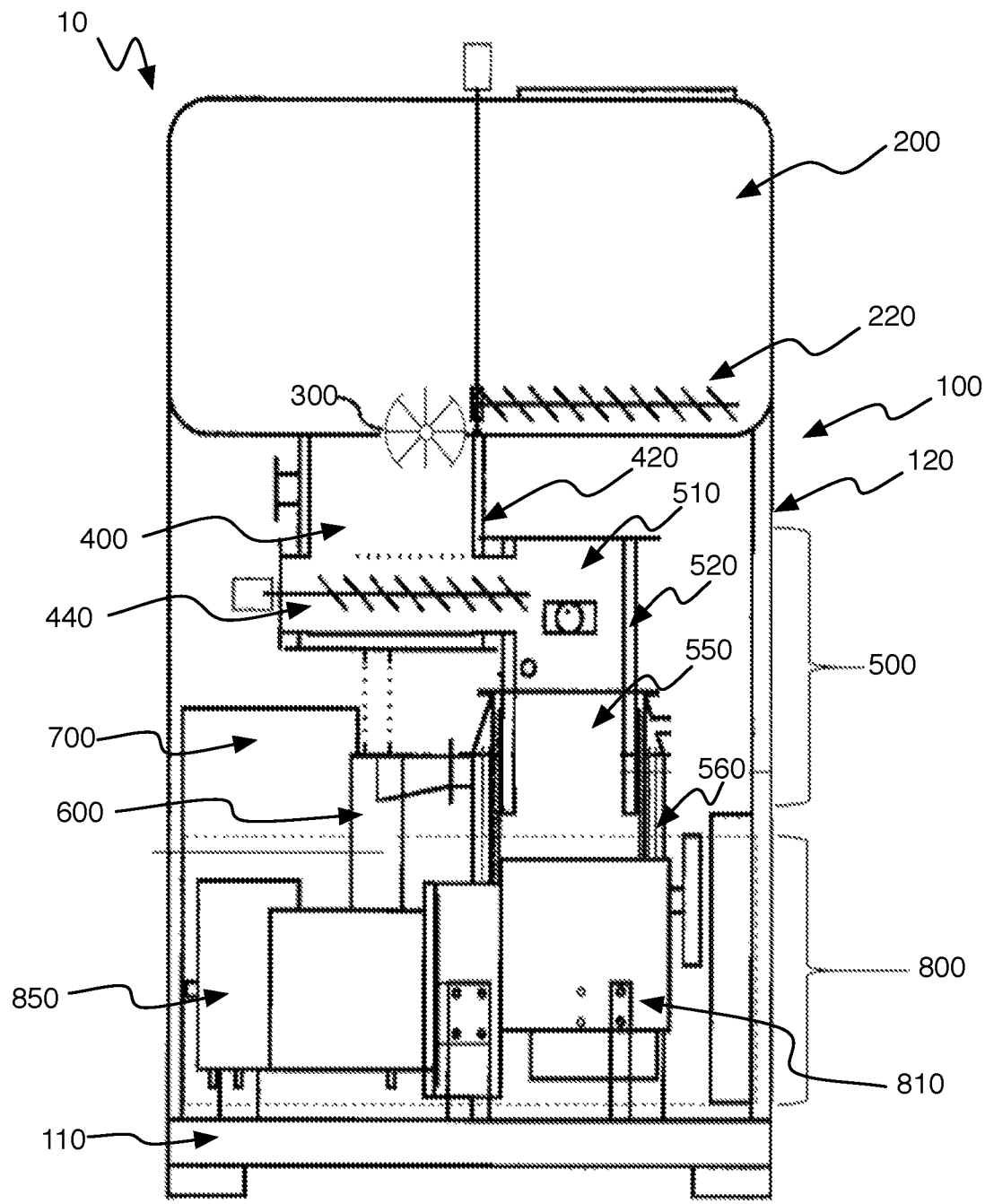
FIGS. 1A and 1B are a side and top view of a variation of the power generation system, respectively.
Figure 1B:
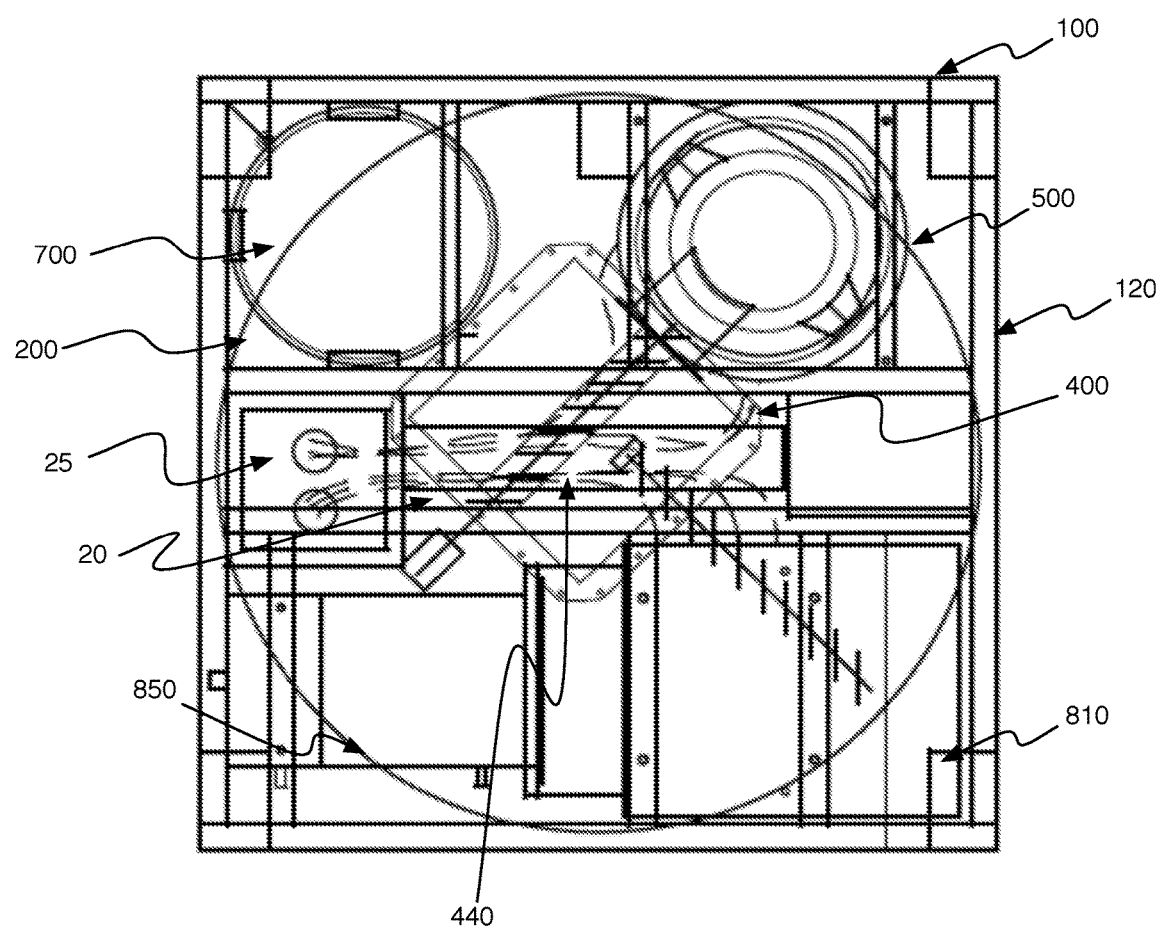

As shown in FIG. 1, the improved power generation system 10 includes a skid 110, a hopper 200, a drying module 400, a gasifier 500 including a pyrolysis module 510 and a reactor module 550, a particulate separator 600, a filtration module 700, and an engine module 800 that cooperate to produce gaseous fuel (syngas or producer gas) from carbonaceous material, and to extract particulates from the gaseous fuel. The gasifier 500 is preferably a downdraft gasifier, but can be any other suitable gasifier. This power generation system 10 is preferably arranged to leverage gravity in transferring fuel precursors to different processing modules, and to leverage various waste heat streams to improve gasifier performance. Furthermore, the arrangement allows the power generation system 10 to have a substantially small footprint (preferably rectangular, more preferably square), such that it can fit on a shipping pallet or within a shipping container. This arrangement also preferably shortens the piping connections between different modules, and allows for control valves to be localized in one area, more preferably on one side of the power generation system 10, for ease of user operation. In one variation of the power generation system 10, the electronics (e.g., engine module), filters, and engine-flare valves (e.g., valves that switch fuel flow between the flare to the engine) are arranged along a common edge of the base 110 to simplify user operation. This arrangement can also allow the power generation system 10 to be shipped in a substantially ready-to-use arrangement, with little to no additional assembly required by the consumer.

The skid 110 of the power generation system 10 functions to support the components of the power generation system 10. The skid 110 is preferably a portion of an enclosure 100, which functions to mechanically protect the components of the power generation system 10. However, the power generation system 10 can alternatively only include the skid 110, and not include walls or a top. The enclosure 100 can additionally function to trap and direct the radiator blast upwards toward and potentially through the hopper 200. The enclosure 100 preferably includes walls extending perpendicularly from the skid 110. The enclosure 100 can additionally include a top 130 arranged parallel the skid 110 across the walls 120. The skid 110 is preferably rectangular or square, with a first corner adjacent a second corner, a third corner adjacent the second corner, and a fourth corner adjacent the first and third corners, but can have any suitable geometric shape. The skid 110 preferably defines the power generation system footprint, but the system footprint can be otherwise defined. In one variation, the skid no is a pallet having standardized dimensions, more preferably standardized shipping pallet dimensions. The enclosure 100 preferably includes four walls, each extending from a respective skid edge, but can alternatively include any suitable number of walls, preferably one wall for each edge. The skid 110 and top can be substantially solid, be porous, be solid with a porous segment, be made of a plurality of tubes or planks, or have any other suitable construction or configuration. The walls 120 are preferably substantially solid, but can alternatively be porous, made of multiple tubes or planks, or have any other suitable construction. The top and walls are preferably removable from the base, but can alternatively be substantially permanently coupled to the base (e.g., welded to the base). The top and walls can alternatively articulate relative to the base (e.g., be coupled by hinges to the base). The enclosure 100 can be a standardized shipping container (e.g., a standardized 20-ft intermodal container, 40-ft high-cube intermodal container, or any other suitable shipping container, etc.), a container built around a standardized base (e.g., a standardized 48 in×48 in pallet or any other suitable standardized pallet), or a container having any other suitable dimensions. The enclosure 100 is preferably metal (e.g., steel, a corrosion-resistant metal, or any other suitable metal), but can alternatively be made of wood, plastic, or any other suitable material. The enclosure 100 is preferably substantially rigid and opaque, but can alternatively be clear. The enclosure 100 is preferably made from an extruded metal sheet, bent and welded into a cube, but can be otherwise manufactured. The enclosure 100 is preferably encases the drying module 400, the gasifier 500 including the pyrolysis module 510 and the reactor module 550, and the particulate separator 600. The enclosure 100 can additionally enclose the airlock 300 if an airlock is used. The enclosure 100 can additionally enclose the engine module 800, the filtration module 700, and the control system. The enclosure 100 is preferably allows free air flow between the ambient environment and the enclosure interior, but can alternatively hold an air seal. The enclosure 100 can additionally enclose the hopper 200, but the hopper 200 can alternatively be mounted to enclosure 100 prior to generator use, wherein the hopper 200 is preferably mounted to the end of the walls 120 distal the skid 110 (e.g., by nuts and bolts coupling a flange of the hopper to the enclosure 100) but can alternatively be mounted to any suitable portion of the enclosure 100. The enclosure 100 can enclose a collapsed hopper, an extended hopper, a rigid hopper, cooperatively define the hopper with one or more auxiliary walls, or enclose any other suitable hopper.

The carbonaceous material fed into the power generation system 10 can be any suitable material that contains carbon, for example, biomass (e.g., wood, plants, algae), biodegradable waste (e.g., any waste generated by a plant or animal), or coal. The carbonaceous material is preferably fed into the hopper 200 by the user, but can alternatively be fed into the hopper 200 by a mechanized system or in any other suitable manner. In the power generator system 10, the carbonaceous material is converted to engine-grade gaseous fuel. The carbonaceous material is first dried by the drying module 400 and pyrolyzed into tar gas and charcoal in the pyrolysis module 510. The tar gas is then combusted and reduced within the reactor module 550 to create gaseous fuel, which is then passed through the air preheating- and gas cooling-heat exchanger 560, exits into the particulate separator 600 for particulate separation, is fed into the walls of the drying module 400 to dry the incoming carbonaceous material, is filtered in the filtration module 700, and is then fed into the carburetor of the engine module 800.

The power generator system 10 recaptures waste heat from both the gasifier and engine outputs, thereby simultaneously improving gasifier performance and reducing component count by cooling the gasifier output without a dedicated cooling module. In particular, the hot, gaseous fuel produced by the reactor module 550 preheats the air used for combustion within the reactor module 550 and also dries and preheats the carbonaceous fuel in the drying module 400; the hot exhaust gas from the engine 810 is used to heat the pyrolysis module 510; and the radiator blast from the engine module 800 is used for the first stage of drying the carbonaceous material in the hopper 200.

The hopper 200 of the power generation system 10 functions to receive carbonaceous material and can function to facilitate moisture removal from the carbonaceous material. The hopper 200 is preferably open to the ambient environment, but can alternatively be sealed, or have the ability to hold an air seal. In a first variation of the hopper 200, the hopper 200 preferably includes a carbonaceous material inlet that allows carbonaceous material to enter the hopper 200 and a hopper boot that allows carbonaceous material to egress into the drying module 400. The carbonaceous material inlet is preferably the open top of the hopper 200, but can alternatively be a channel, pipe, flume any other suitable lead-in in the side or base of the hopper 200. The hopper boot is preferably a controlled opening on the bottom of the hopper 200, and is preferably located above the drying module inlet, more preferably substantially near the center of the hopper base 210, but alternatively in any suitable position. The hopper 200 is preferably a generally cylindrical structure, and preferably has a diameter substantially similar to the width of the skid (shipping pallet) or enclosure footprint, but can alternatively be conical or any other suitable shape. An end of the hopper 200 is preferably fastened to the inlet of the drying module 400 (e.g., with nuts and bolts or any other suitable fastener), such that the hopper 200 is coupled to the drying module 400 during shipping or transportation, but the hopper 200 can alternatively be removably coupled to the drying module 400, be a separate component that is shipped in the same enclosure, or can be a component that the user assembles and installs. The hopper 200 is preferably made of a flexible material, preferably supported by ribbing (e.g., rings or a spiral along the height of the hopper 200), such that it can collapse and be transported with the body of the power generation system 10. Alternatively, the hopper 200 can be formed from multiple pieces of hinged material that can collapse into a substantially flat configuration for shipping, but can be extended to form a substantially cylindrical hopper 200. Alternatively, the hopper can be made of solid material, without collapsible features, and be shipped in its fully distended and operational form. The hopper material is preferably porous to allow better carbonaceous material drying, wherein the pores are preferably smaller than the carbonaceous material particulate size. In one variation, the hopper 200 includes a perforated base that facilitates carbonaceous material pre-drying with radiator heat from the engine 810 or particulate separator 600. The hopper material is preferably polymeric and corrosion-resistant, but can alternatively be treated, coated, or be bare metal. The hopper 200 is preferably formed from an extruded piece of material, but can alternately be formed from one or more pieces of woven, injection molded, cast, sintered, or any other suitable material manufactured in any suitable manner. The hopper 200 is preferably substantially transparent such that the user can see the fuel level, but can be semi-transparent or substantially opaque. However, any other suitable hopper in any suitable configuration that receives carbonaceous material can be utilized. In a second variation of the hopper, the hopper 200 is preferably substantially defined by the walls of the enclosure 100. More preferably, the hopper 200 occupies and is at least partially defined by an end of the enclosure 100 (e.g., the hopper 200 extends along approximately half of the enclosure longitudinal axis). The hopper 200 preferably includes a flat bottom, but can alternatively include an angled bottom, wherein the lower portion is preferably adjacent the enclosure end, or have any other suitable geometry. The hopper base 210 is preferably louvered or perforated to promote carbonaceous material drying, but can alternatively be solid. In one alternative of the hopper 200, the engine radiator 820 or particulate separator 600 extends under the raised portion of the angled hopper base 210. The hopper 200 can additionally include an external material transporter that moves carbonaceous material from the enclosure exterior to the hopper interior. The external material transporter preferably moves carbonaceous material from an area proximal the skid 110 to the top of the hopper 200, but can alternatively move carbonaceous material to and from any suitable position.

The hopper 200 can additionally include a carbonaceous material transporter 220 that moves the carbonaceous material from the body of the hopper 200 to the drying module 400, preferably through the airlock 300 but alternatively through an opening in the bottom of the hopper 200. The carbonaceous material transporter 220 preferably removes the carbonaceous material from the bottom of the hopper (e.g., the portion of the hopper proximal the drying module 400 but alternatively the portion of the hopper 200 proximal the skid 110), but can alternatively remove any suitable portion of the carbonaceous material within the hopper 200. The carbonaceous material transporter 220 is preferably substantially parallel to the hopper base 210, but can alternatively be at an angle to the hopper base 210. The carbonaceous material transporter 220 is preferably a full bottom feeder, such as a sweep auger, scroll feeder, vibratory feeder, rotary table feeder, chain feeder, or any suitable material transporter. Utilizing a full bottom feeder can confer several benefits: first, it allows for a substantially cylindrical hopper to be used instead of a tapered hopper, which suffers from low hopper volume, failures with large and/or inconsistent fuels, and the bridging and arching modes of taper feeders. Second, a full bottom feeder allows for a low and wide hopper to be used, which allows for easier transportation and use (e.g., the hopper 200 is easier to fill). The full bottom feeder can include a sweep auger, scroll feeder, a rotary feed table, rotary plow feeder, vibratory feeder, flat bottom feeder, any suitable transporter that feeds solid fuel from a flat bottom container to single outlet chute. The rotation speed of the carbonaceous material transporter 220 can be varied depending on the fuel requirement of the gasifier 500 the existing carbonaceous material content within the gasifier 500, and/or any other suitable factor. The carbonaceous material transporter 220 can be hand driven, but can alternatively be coupled to a motor that automatically rotates the auger to regulate the carbonaceous material within the gasifier 500. However, any other suitable type of transporter can be used for the carbonaceous material. Alternatively, gravity can be used to feed carbonaceous material to the drying module 400, particularly when the hopper geometry facilitates (e.g., funnels) carbonaceous material transportation. This variation can decrease the need for a driven material transporter, and can decrease the amount of energy required to run the gasifier 500. The carbonaceous material within the hopper 200 is preferably pre-heated and partially dried by the hot air from the radiator blast of the engine 810, but can alternatively be pre-heated and dried from heat radiating from the drying module 400, heat radiating from the body of the gasifier 500, or simply dried by allowing the moisture in the carbonaceous material to equilibrate with the ambient environment. The carbonaceous material in the hopper 200 can additionally be pre-heated/dried from any other heat source. In one variation, the carbonaceous material transporter 220 is angled relative to the skid 110 (e.g., relative to a normal vector or broad face of the skid 110). This can be particularly desirable when the hopper base 210 is angled, wherein the angle of the carbonaceous material transporter 220 is preferably substantially the same as the hopper base 210 angle. The carbonaceous material transporter 220 preferably includes first end and a second end, wherein the first end is preferably lower than the second end.

The power generation system 10 can additionally include airlock 300 that functions as an airlock transition point that seals the gasifier 500, preventing gas (air) ingress or egress, while maintaining the flow of material between the hopper 200 and the drying module 400. However, some variations of the power generation system 10 an exclude an airlock, wherein the hopper preferably maintains an air seal for the remainder of the power generation system 10. Effectively, the airlock 300 maintains an air seal in the body of the gasifier 500, more preferably with the inlet of the drying module 400, such that airflow within the body of the gasifier 500 can be controlled, which is desirable because pyrolysis in the pyrolysis module 510 must occur in the absence of oxygen and because achieving a strong air blast out the nozzles in the reaction module requires pulling or pushing against a sealed reactor environment. Furthermore, the airlock 300 feeds carbonaceous material from the ambient environment into the sealed system. The airlock 300 is preferably arranged within the hopper boot (e.g., hopper base 210), but can alternatively be arranged between the hopper boot and the drying module 400, within the hopper 200 before the hopper boot, or within the drying module 400. Alternatively, the airlock 300 can be located below a raised end of the carbonaceous material transporter, such as when the carbonaceous material transporter is angled relative to the skid 110. The airlock 300 arrangement allows for the body of the gasifier 500 to hold an air seal while allowing the hopper 200 to be open to the ambient atmosphere. This airlock configuration confers two benefits: first, airflow within the body of the gasifier 500 can be controlled. Second, the airlock placement allows the hopper 200 to be open to the ambient environment. This permits the hopper 200 to be collapsible, allowing for easy transportation (e.g., during shipping); eliminates the need for airtight installation of a new hopper, allowing the hopper volume to be easily changed; and allows for the carbonaceous material pre-drying (in the hopper 200) to the ambient environment, which removes moisture from the system such that moisture introduction into the reactor module is reduced, thereby preventing thermal drag on reactor temperatures. The airlock 300 is preferably a rotary airlock feeder, but can alternatively be a single or double sluice value, a double dump mechanism, an iris valve, a rotating plate valve, or any suitable airlock 300. The rotary airlock feeder is preferably oriented with the rotational axis perpendicular to a gravity vector, but can alternatively be oriented with the rotational axis parallel to the gravity vector, or oriented in any suitable position. The carbonaceous material transport mechanism preferably feeds carbonaceous material to the airlock 300, but the weight of the carbonaceous material can also feed the carbonaceous material to the airlock 300.

The drying module 400 of the power generation system 10 functions to hold and dry a quantity of the carbonaceous material. The drying module 400 is preferably located within the air-sealed environment of the gasifier 500, and preferably includes a portion arranged substantially below the hopper 200, more preferably below the airlock 300, such that undried carbonaceous material is dropped into the drying module 400. However, the drying module 400 can be arranged beside the hopper 200 or in any other suitable position. The drying module 400 preferably includes a carbonaceous material inlet in communication with the hopper 200 that allows carbonaceous material into the drying module 400, and a carbonaceous material outlet that allows carbonaceous material out of the drying module 400 and into the pyrolysis module 510. Carbonaceous material is preferably transported through the airlock 300 from the hopper 200, through the carbonaceous material inlet, and into the drying module 400, wherein the carbonaceous material is preferably heated and dried by the gaseous output of the reactor module 550. However, carbonaceous material can be transported through an open hole in the hopper bottom into the drying module 400. As the carbonaceous material is heated, the water content of the carbonaceous material is vaporized. The water vapor will still pass through the reactor, but with substantially less thermal drag, given the energy intensive vaporization stage is not reliant on heat from combustion in the gasifier. The drying module 400 is preferably a traditional auger boot, with two angled walls and two vertical walls, or a cylindrical vessel, but can be of any suitable geometry. The drying module 400 preferably fastens to the hopper 200 or airlock 300 through endplates (e.g., by nuts and bolts, screws, or any other suitable fastening mechanism), but can otherwise fasten to the hopper 200 or airlock 300.

In one variation, the drying module 400 is a straight channel entirely located below the hopper 200, oriented with a longitudinal axis parallel the longitudinal axis of the hopper 200. The drying module 400 is preferably substantially smaller than the hopper 200, and is preferably located near the center of the hopper 200 but can alternatively be eccentrically arranged relative to the hopper center. The inlet is preferably the top of the drying module 400 (the part proximal the hopper 200), and the outlet is preferably arranged on the side of the drying module 400 near the bottom of the drying module 400 (the part distal the hopper 200). The bulk of the drying module 400 is preferably offset from and arranged above the pyrolysis module 510 (e.g., distal the skid 110), such that only the substantially dried carbonaceous material is pulled from the bottom of the drying module 400 and transported into the pyrolysis module 510. Because water vapor flows upward and the wettest carbonaceous material is fed in from the top, the carbonaceous material at the bottom of the drying module 400 is the driest material, and the material that is most fit to undergo pyrolysis. In another variation, the drying module 400 includes a channel extending at an angle from the hopper 200 to the pyrolysis module 510, wherein the inlet is preferably is arranged below the hopper 200 (or airlock 300) and the outlet is preferably connected to the top of the pyrolysis module 510, distal the reactor module 550. However, the inlet and outlet of the drying module 400 can be otherwise arranged.

The drying module 400 can additionally include a first heat exchanger 420 thermally coupled to the drying module 400. The first heat exchanger 420 preferably includes an inner jacket that is formed by rolling a continuous piece of sheet metal and preferably includes flange rings coupled to the ends of the cylinder formed by the sheet metal and end plates fastened (e.g., using nuts and bolts or any other suitable fastener) to the sheet metal and flange rings that substantially maintains the rolled shape of the sheet metal. The drying module 400 can be defined within the lumen of the inner jacket, or can be a separate component located within the lumen defined by the inner jacket. The first heat exchanger 420 preferably also includes an outer jacket, formed using substantially similar materials and methods as the inner jacket, that couples around the inner jacket through the endplates (e.g., by nuts and bolts, a weld, or any other suitable fastening mechanism). Gaseous fuel from the reactor module 550 is preferably introduced into the first heat exchanger 420 to dry the carbonaceous material, but gaseous fuel from the particulate separator 600 or gaseous fuel from the third heat exchanger 560 can alternatively be used. The gaseous fuel path preferably extends from the particulate separator 600 or the reactor module 550 up to the first heat exchanger 420. The inlet of the first heat exchanger 420 is preferably arranged proximal the outlet of the drying module 400, but can alternatively be proximal the inlet of the drying module 400. The outlet of the first heat exchanger 420 is preferably fluidly connected to the filtration module 700 or to the fuel inlet of the engine 810. The temperature of the gaseous fuel that exits directly from the reduction reaction in typical gasifers can be around 700-900° C., but the particulate separator 600 and/or the third heat exchanger 560, which preheats the incoming air, can lower the temperature of this gaseous fuel output to around 200° C.-300° C. More preferably, the gaseous fuel output temperature is preferably lowered to a range of around 150° C.-220° C. before ingressing into the first heat exchanger 420, such that maximal drying can be achieved without inducing pyrolysis. Preventing pyrolysis in the drying section can be desirable to avoid the build up of tar condensates and generally maintain the cleanliness of the system. However, any other suitable temperature can be used.

To facilitate transport of the carbonaceous material into the pyrolysis module 510, the drying module 400 can additionally include a second carbonaceous material transporter 440 that transports the dried carbonaceous material from the drying module 400 into the pyrolysis module 510. The material transporter is preferably an auger, but can also be a drag chain, conveyor, plug feeder, walking floor or any other type of transporter. The second carbonaceous material transporter 440 preferably pulls carbonaceous material from the bottom of the drying module 400, through the carbonaceous material outlet of the drying module 400, and drops the dry carbonaceous material into the pyrolysis module 510. Alternatively, the second carbonaceous material transporter 440 can function as a lift, transporting the carbonaceous material through the drying module 400 from a lower drying module inlet to a higher drying module outlet. The second carbonaceous material transporter 440 is preferably substantially similar to the first, and preferably operates at substantially the same speed, such that carbonaceous material flow through the system is substantially constant. However, the second carbonaceous material transporter 440 can be a substantially different mechanism, run at a substantially different speed, and/or operated by a substantially different method.

The gasifier 500 of the power generation system 10 functions to produce gaseous fuel from the carbonaceous material. The gasifier 500 is preferably substantially fluidly sealed, aside from the air input of the reactor module 550, and is preferably capable of maintaining an internal pressure higher or lower than that of the ambient environment. The gasifier 500 is preferably fluidly connected to the fuel input of the engine module 800, wherein the engine module 800 converts the gaseous fuel into rotary motion, then to electrical power. The gasifier 500 preferably includes the pyrolysis module 510 and the reactor module 550. The gasifier 500 preferably additionally includes a second and third heat exchanger 560 that uses waste heat from the generated gaseous fuel and the engine exhaust to heat the air heat exchanger 560, drying module 400, and pyrolysis module 510, respectively. The gasifier 500 can additionally include any other suitable generator component.

The pyrolysis module 510 of the gasifier 500 functions to pyrolyze dry carbonaceous material into tar gas and charcoal. More specifically, the carbonaceous material is heated at a substantially high temperature (typically above 220° C.), in the substantial absence of oxygen, thus distilling the carbonaceous material into tar gas and charcoal. Tar gas and charcoal are the precursors necessary for the following combustion and reduction stages in gasification. The pyrolysis module 510 preferably includes a dried carbonaceous material inlet that allows dried carbonaceous material from the drying module 400 to enter the pyrolysis module 510 and a tar gas and charcoal outlet that allows the tar gas and charcoal to exit the pyrolysis module 510, preferably into the reactor module 550. Similar to the drying module 400, the pyrolysis module 510 preferably also of a generally cylindrical structure that includes an inner jacket and an outer jacket that cooperatively define an annual space in between the inner jacket and the outer jacket. The pyrolysis module 510 is preferably constructed using similar or identical materials and methods as described above for the drying module 400, but can alternatively be constructed using any other suitable material and method.

The annular space surrounding the pyrolysis module 510 preferably defines the second heat exchanger 520. Exhaust gas from the engine module 800 is preferably piped into the second heat exchanger 520 to pyrolyze the dry carbonaceous material within the pyrolysis module 510. The temperature of the exhaust gas that enters this annular space can be in the range of 500° C.-700° C., and preferably contains enough heat energy to heat the dried carbonaceous material to temperatures that pyrolyze the dried carbonaceous material into tar gas and charcoal. Temperatures necessary to pyrolyze carbonaceous material are generally above 220° C. The second heat exchanger 520 preferably includes an inlet fluidly connected to the exhaust of the engine 810 of the engine module 800, and preferably includes an outlet fluidly connected to the ambient environment but alternatively connected to any other suitable fluid reservoir. To minimize the connection length between the pyrolysis module 510 and the engine exhaust, as well as to minimize thermal losses from the exhaust gas stream, the pyrolysis module 510 is preferably arranged adjacent the engine exhaust, more preferably in a corner adjacent the engine 810 of the engine module 800 but alternatively in any other suitable location. The exhaust path length is preferably substantially less than a side of the skid 110, preferably less than the length of enclosure, and more preferably less than the width of the enclosure. The fluid connection from the engine 810 to the pyrolysis module 510 is also preferably insulated to minimize thermal loss from the transported exhaust gasses, but can similarly be uninsulated.

The pyrolysis module 510 is preferably located directly above the reactor module 550, and is preferably coupled to the reactor module 550 through flange rings and endplates. Furthermore, the pyrolysis module 510 is preferably located in a corner of the square footprint. However, any other suitable method of arranging the pyrolysis module 510 can be used. The tar gas and charcoal outlet of the pyrolysis module 510 preferably extends into the reactor module 550, allowing tar gas and charcoal to exit the pyrolysis module 510 and flow directly into the reactor module 550 through gravity. The sealed reactor environment will cause the tar gas to propagate into the reactor module 550, and char will similarly enter the reactor module via gravity. However, the tar gas and charcoal can be actively moved into the reactor module 550, for example with a motor, or can be transported into the reactor module 550 using any suitable method. While the tar gas and charcoal outlet of the pyrolysis module 510 can extend into the reactor module 550, the heat from the reactor module 550 preferably does not substantially affect heat within the pyrolysis module 510, thus decreasing the thermal load on the reactor module 550. The depth that the tar gas and charcoal outlet extends into the reactor is preferably where the temperature of the pyrolysis module 510 is substantially higher than that of the reactor module 550 at that particular level, discouraging heat transfer from the reactor module 550 into the pyrolysis module 510. However, any other suitable arrangement of the pyrolysis module 510 can be used.

The reactor module 550 of the gasifier 500 functions to combust the tar gas and to reduce the combusted tar gas with the charcoal. More specifically, the tar gas is placed in contact with oxygen at combustion temperatures to combust, and the combusted tar gas is placed in contact with the charcoal to reduce into carbon monoxide (CO) and hydrogen ($H_2$), which can then be used as gaseous fuel. As described above, the tar gas and charcoal enters the reactor module 550 from the tar gas and charcoal outlet of the pyrolysis module 510. The reactor module 550 preferably includes an air path that channels air with a suitable amount of oxygen from any suitable air source (e.g., ambient air) to the interior of the reactor module 550, allowing combustion and reduction of the tar gas. The reactor module 550 is preferably of the Imbert reactor type (e.g., the throat and nozzles), but can alternatively be any other suitable reactor type.

The reactor module 550 is preferably located inside a substantially cylindrical gas cowling that substantially envelops the reactor module 550. The gas cowling also preferably includes sheet metal, flange rings, and end plates that maintain the shape and fasten the gas cowling to the reactor module 550. The gas cowling preferably accommodates a variety of reactor types. The gas cowling and the reactor module 550 preferably cooperatively define a third heat exchanger 560, an annular space between the reactor module 550 and the gas cowling. The gaseous fuel outlet of the reactor module 550 is preferably fluidly coupled to the gas cowling. The gaseous fuel outlet is preferably located at the bottom of the reactor module 550 (e.g., proximal the skid 110 or pallet, distal the pyrolysis module 510), such that the gaseous fuel exits after the reduction reaction from the bottom of the reactor and is directed upwards and around the reactor module 550 by the gas cowling. However, the gaseous fuel outlet can be located at any suitable position. This hot, gaseous fuel is preferably used to preheat the air used to combust the tar gas within the reactor module 550, wherein the air path is preferably located within the annular space between the reactor module 550 and the gas cowling (third heat exchanger 560). The air path preferably wraps around all or a portion of the reactor module perimeter prior to entering the reactor module interior. The air path inlet is preferably proximal the reactor module bottom (e.g., end of reactor module 550 proximal the skid 110) and the air path outlet is preferably proximal the reactor module 550 top (e.g., end of reactor module 550 distal the skid 110 and proximal the pyrolysis module 510), allowing the air path to traverse substantially the entire length of the third heat exchanger 560. However, the air path inlet and outlet can be located in any suitable position. This air path arrangement substantially increases the output temperature of the air introduced into the reactor module 550 and substantially decreases the output temperature of the gaseous fuel. Additionally, as a result of the heat transfer, the temperature of the reactor module 550 is substantially lower at the top than at the bottom, allowing the pyrolysis module 510 to be inserted into the reactor module 550 without substantial heat transfer from the reactor module 550 to the pyrolysis module 510 and facilitating transport of tar gas and charcoal into the reactor module 550. However, any other arrangement suitable arrangement of the reactor module 550 can be used.

The gas cowling of the third heat exchanger 560 can also include a sediment collector located below the reactor module 550 that collects particulates that are extracted from the gaseous fuel and/or the ash that results from the charcoal after the combusted tar gas is reduced with the charcoal. The sediment collector is preferably removable to allow for the sediments to be disposed of after use. However, any other suitable arrangement of the sediment collector may be used.

The particulate separator 600 of the power generation system 10 functions to extract particulates from the gaseous fuel prior to fuel ingress into the first heat exchanger 420. The particulate separator 600 can additionally extract heat from the gaseous fuel output prior to using the heat to dry the carbonaceous material. The particulate separator 600 is preferably fluidly connected to the outlet of the third heat exchanger 560 and to the inlet of the first heat exchanger 420. The particulate separator 600 preferably includes a gaseous fuel input that receives gaseous fuel from the gaseous fuel outlet of the gas cowling and a gaseous fuel output that is coupled to the gaseous fuel inlet of the first heat exchanger 420. The particulate separator 600 is preferably operable at high temperatures. The particulate separator 600 can be a cyclone module that uses centrifugal force to separate particulates from the gaseous fuel, but can alternatively include any other suitable particulate separator. In the process of routing the gaseous fuel through the cyclone module, heat can additionally be radiated out into the ambient environment. To this end, the particulate separator 600 can additionally include heat-radiating features (for example, heat fins, a pin matrix, etc.) that facilitate the extraction of heat from the gaseous fuel output during particulate extraction. Furthermore, as heat loss from the generated fuel is inversely proportional to the fuel flow rate out of the reactor module (e.g., more heat is lost when fuel flows at lower rates), cyclone operation can be optimized to adjust the amount of heat extracted by the cyclone (e.g., by adjusting the fuel flow rate within the cyclone, as determined empirically or from a chart). The particulate separator 600 is preferably arranged underneath the first heat exchanger 420 to minimize connection length, but can similarly be mounted elsewhere on the gas cowling. More preferably, the particulate separator 600 is fluidly connected to a portion of the first heat exchanger 420 proximal the skid 110. Alternatively, the particulate separator 600 can be thermally connected to a water path that receives water from a water source, such as filter condensate, hopper condensate, or water from a dedicated external water source. The heat extracted by the particulate separator 600 preferably heats the water within the water path, vaporizing the water. The water vapor (steam) can subsequently be fed into the reactor module to improve gas quality. However, any other suitable arrangement of the particulate separator 600 can be used. The particulate separator 600 can be arranged adjacent the hopper 200 to dry the carbonaceous material with the extracted heat. The portion of the particulate separator 600 proximal the hopper 200 preferably has a larger surface area than portions of the particulate separator 600 distal the hopper 200, but can alternatively have a similar surface area or any other suitable surface area. In one variation of the power generation system 10, the particulate separator 600 is located below the hopper 200, between the hopper 200 and the skid 110. In another variation of the power generation system 10, the particulate separator 600 is located adjacent the hopper 200, wherein both the hopper 200 and the particulate separator 600 are mounted to or defined by the skid 110. However, the particulate separator 600 can be otherwise arranged.

The filtration module 700 of the power generation system 10 functions to extract fine particulates and any remaining tar gas from the gaseous fuel, such that the fuel provided to the carburetor of the engine 810 is clean, engine-grade fuel. The filtration module 700 is preferably a packed bed, made from a cylindrical steel drum that is filled with a filtration media (e.g., fine grain wood chips, activated carbon, etc). Alternatively, the filtration module 700 can be a water scrubber, electrostatic precipitator, ceramic candle, bag house, or any other suitable filtration system. The filtration module 700 preferably includes a gaseous fuel inlet, located substantially near the bottom of the filtration module 700 (distal from the drying module 400), and a gaseous fuel outlet, located substantially near the top of the filtration module 700. The gaseous fuel inlet is preferably fluidly connected to the first heat exchanger 420, and the gaseous fuel outlet is preferably fluidly connected to an engine fuel inlet. The gaseous fuel is preferably piped from the first heat exchanger 420 (the annular space of the drying module 400), after it has dried the carbonaceous material, into the bottom of the filtration module 700 through the gaseous fuel inlet, wherein the gaseous fuel is filtered as it rises through the filtration material, emerging from the gaseous fuel outlet as substantially clean gaseous fuel. The filtered fuel is then preferably provided to the carburetor of the engine module 800. The filtration module 700 is preferably located adjacent to the drying module 400 to minimize the connection length, and is also preferably located adjacent the engine fuel inlet and the pyrolysis-reactor assembly. In one variation of the power generation system 10, the filtration module 700 can be located in a corner adjacent the pyrolysis-reactor assembly corner in the square footprint. In another variation of the power generation system 10, the filtration module 700 can be located along a longitudinal edge of the enclosure, adjacent the pyrolysis-reactor assembly, more preferably between the pyrolysis-reactor assembly and the hopper 200. However, the filtration module 700 can be located in any suitable position. The power generation system 10 preferably includes one filtration module 700, but can alternatively include any suitable number of filtration modules. Multiple filtration modules preferably have substantially similar configurations, but can alternatively have different configurations. Multiple filtration modules are preferably fluidly coupled in series, but can alternatively be fluidly coupled in parallel.

The power generation system 10 can require a startup system that pulls gas through the system. To this end, the power generation system 10 can additionally include an ejector module, blower, fan or other gas drive mechanism coupled to the filtration system. The ejector module is preferably coupled to the filtration system substantially near the gaseous fuel outlet, but can alternatively be otherwise coupled to the filtration system, the drying module 400, or any other connection point downstream from the reactor module 550. The ejector module output is preferably coupled to a combustion flare, with variable air mixing system to ensure full combustion. The ejector system is preferably coupled to the top of the filtration system, more preferably to the center of the cap, wherein the gas flare preferably extends horizontally out from the ejector system into the corner of the square footprint, and extends vertically through the corner space provided by the circular hopper of the drying module 400. The ejector system is coupled to an air input, compressed air is preferably pumped into the ejector system through the air input. When the high velocity of air suddenly expands into the wide ejector system, it entrains a large quantity of gas, producing a negative pressure that pulls gas through the filtration module 700 and, subsequently, the rest of the power generation system 10. However, the power generation system 10 can additionally include a fan at the air inlet of the reactor module that pushes air into the reactor module, a fan or vacuum-generating mechanism (e.g., the engine) that pulls gaseous fuel out of the reactor module, or any other suitable mechanism that induces fluid movement.

The engine module 800 of the power generation system 10 functions to convert gaseous fuel into electricity. The engine module 800 (genset) preferably includes an internal combustion engine 810 that converts the gaseous fuel into motion, an alternator 850 that converts the motion into electricity, and a drive mechanism that transfers motion from the engine 810 to the alternator 850. Gaseous fuel is preferably introduced into the fuel inlet of the engine, more preferably into the carburetor of the engine from the filtration module 700, but can alternately be introduced from the first heat exchanger 420, the heat exchanger, or directly from the third heat exchanger 560/reactor module 550. As aforementioned, the engine 810 and alternator 850 are preferably arranged in an in-line configuration, but can alternatively have any suitable configuration. In comparison to a side-by-side engine-alternator configuration, the in-line configuration allows for a shorter drive mechanism to be used, and allows for the other components of the power generation system 10 to fit within the enclosure footprint. In one variation of the power generation system 10, the engine 810 occupies one corner of the enclosure footprint and the alternator 850 occupies an adjacent corner. In another variation of the power generation system 10, the alternator 850 occupies a corner of the enclosure footprint and the engine 810 is located along the enclosure body (e.g., along a longitudinal edge but alternatively along a lateral edge). The engine 810 preferably includes a radiator 820 and an exhaust. The radiator 820 is preferably arranged adjacent and/or below the hopper 200, but can alternatively be arranged elsewhere. The radiator 820 can include a plenum that directs and/or contains heated air radiated from the engine. The radiator position is preferably adjustable, but can alternatively be static. The radiator plenum volume and/or direction is preferably adjustable, but can alternatively be statically fixed. In one variation of the power generation system 10, the radiator 820 is arranged below a raised end of the hopper base 210. The engine 810 is preferably oriented with the engine exhaust proximal the pyrolysis module 510, but can alternatively be oriented with the engine exhaust distal the pyrolysis module 510. The piping leading from the engine exhaust to the pyrolysis module 510 preferably passes below the hopper 200, but can alternatively pass adjacent the hopper 200 or be distal from the hopper 200. The alternator 850 is preferably oriented with a power interface (e.g., plugs) proximal an edge of the enclosure 100, but can alternatively be arranged in any suitable manner. The engine 810 is preferably an internal combustion engine, and is preferably an inline cylinder configuration (e.g., 2, 3, 4, 5, or 6 cylinders, etc.) so as to optimally locate the exhaust manifold output immediately adjacent to the pyrolysis module input. However, any engine configuration is acceptable, with appropriate piping solutions to distribute the hot exhaust to the pyrolysis module. The alternator 850 is preferably a standard 10 kW alternator, but can alternatively be a 20 kW alternator, a 100 kW alternator, or any other suitable alternator that converts motion from the engine 810 into electricity. The drive mechanism is preferably a direct drive inline engine-alternator coupled solution, however a belt drive that couples the crankshaft of the engine to the rotor of the alternator 850 or any other suitable drive mechanism can alternatively be used.

2. First Specific Example—Configuration for a Standard Shipping Pallet

Figure 2A:
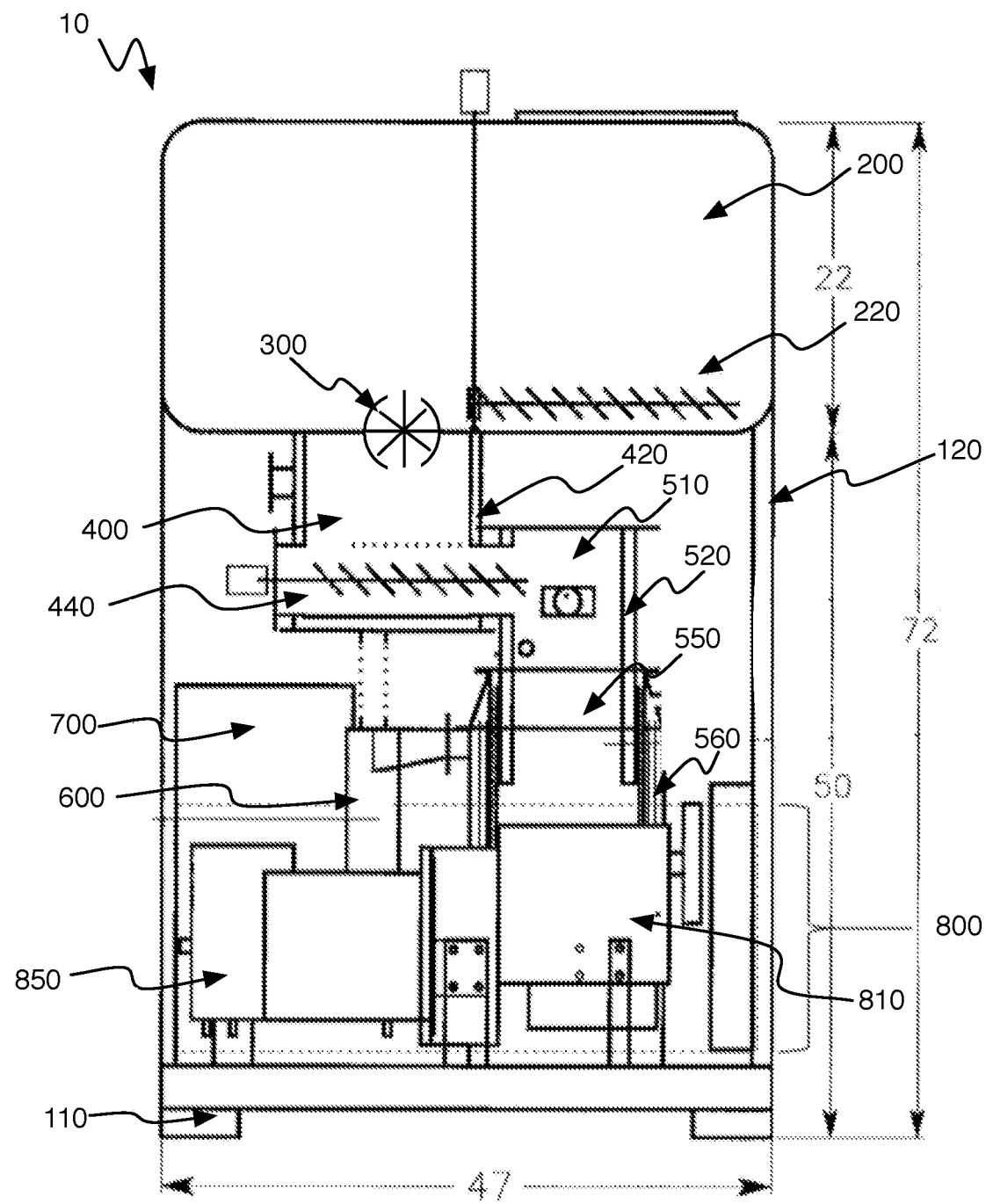
FIGS. 2A and 2B are a side and top view of a specific example of the power generation system, respectively.
Figure 2B:
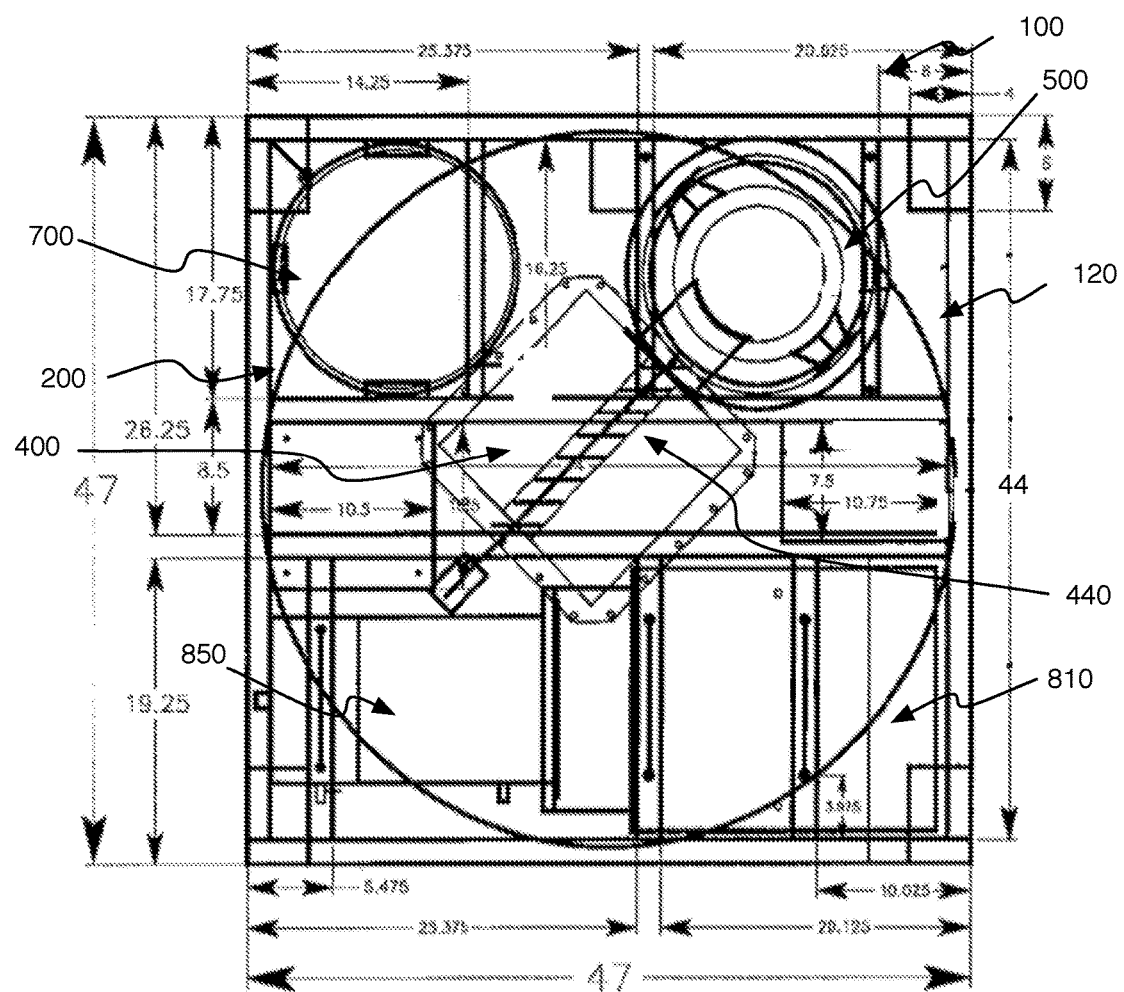
Figure 3A:
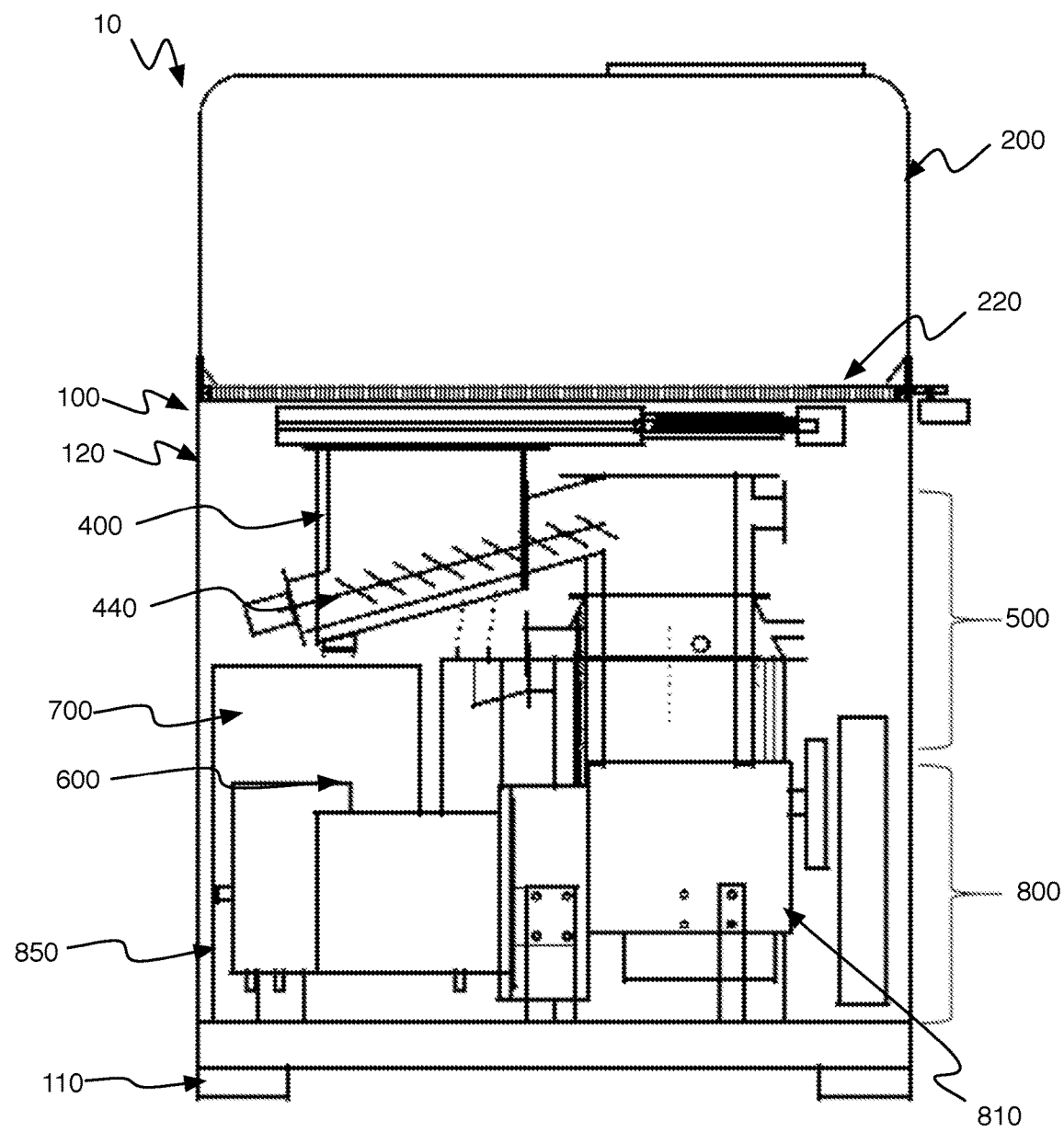
FIGS. 3A and 3B are a side and top view of an example of the power generator system with a swirl hopper material transporter.
Figure 3B:
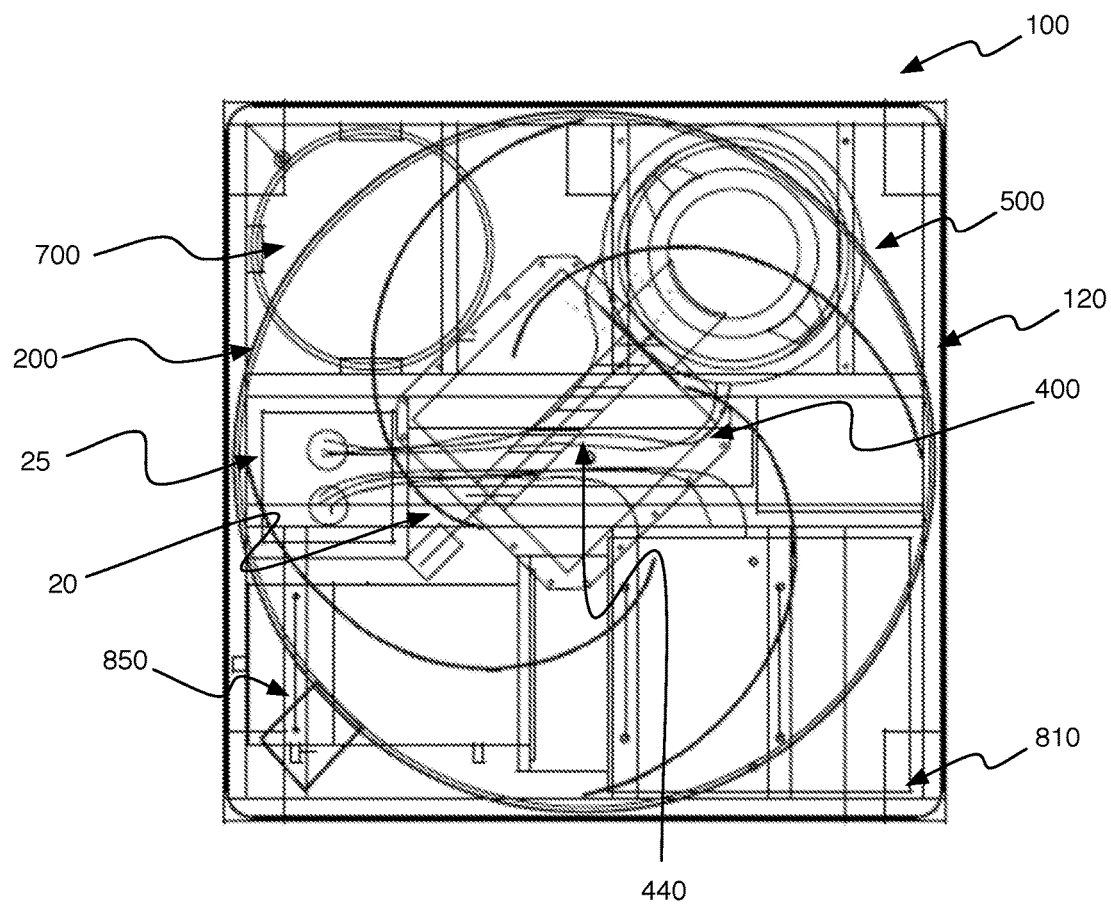

In a first specific example of the power generation system 10, as shown in FIGS. 1A, 1B, 3A, and 3B, the power generation system 10 is configured to fit on a standard shipping pallet (e.g., an ISO standard pallet, North American standard pallet as shown in FIGS. 2A and 2B, European pallet, Australian pallet, etc.). The shipping pallet preferably forms the skid 110. The enclosure can additionally include enclosure walls 120 that are preferably perpendicularly mounted to the skid 110 to form a fully enclosed system. The enclosure can additionally include a top 130. The pallet preferably has a broad face defining a first corner adjacent a second corner, a third corner adjacent the second corner, and a fourth corner adjacent the first and third corners, wherein the four corners are preferably defined in a common plane. The power generation system 10 includes a reactor module 550 located in the first corner, a pyrolysis module 510 coaxially arranged above the reactor module 550 (e.g., such that the reactor module 550 is between the pyrolysis module 510 and the pallet), a drying module 400 located offset from and above the pyrolysis module 510 (e.g., such that the pyrolysis module 510 is between the drying module 400 and the pallet), and an engine module 800 (genset) occupying the second and third corners. The power generation system 10 can optionally include an airlock 300 located above the drying module 400 (e.g., the drying module 400 is located between the airlock 300 and the pallet) that creates a substantially fluid impermeable seal with the drying module 400. The fluid path between the drying module 400, pyrolysis module 510, reactor module 550, and engine module 800 is preferably substantially fluidly sealed from the ambient environment, sans the air input for the reactor module 550. The drying module 400 can vertically overlap with some of the generator components (e.g., the bottom of the drying module 400 overlaps with the top of the pyrolysis module 510), but is preferably arranged above the rest of the generator components, substantially near the center of the pallet footprint. The drying module 400 can additionally include a material transporter located proximal the pallet within the drying module 400, wherein the material transporter moves carbonaceous material from the bottom of the drying module 400 into the pyrolysis module 510. The engine module 800 and reactor module 550 are preferably directly mounted to the pallet, while the pyrolysis module 510 is preferably mounted to the reactor module 550 and the drying module 400 is preferably mounted to the pyrolysis module 510. The engine 810 preferably occupies the second corner while the alternator 850 occupies the third, but the engine module 800 can be otherwise arranged. The power generation system 10 can additionally include a hopper 200 above the drying module 400, such that the drying module 400 is between the hopper 200 and the pallet. The hopper 200 preferably has a major dimension (e.g., diameter) substantially equivalent to the width or length of the pallet. The hopper 200 is preferably an open cylinder with a closed end (wherein the closed end is proximal the pallet), but can alternatively be a cone with the apex proximal the pallet or have any other suitable configuration. The hopper 200 is preferably collapsible and comes pre-mounted to the gasifier 500, but can alternatively be shipped as a separate component (in a rigid or collapsed state) or be rigid and pre-mounted to the gasifier 500. The hopper 200 is preferably porous (e.g., made of mesh), but can alternatively be substantially solid. The hopper 200 preferably forms an air seal with the rest of the power generation system 10, but can alternatively be open to the ambient environment and include an airlock 300. The airlock 300, when included, is preferably located in the bottom of the hopper 200 (the portion of the hopper 200 proximal the pallet), but can alternatively be located in the drying portion or between the two components. The airlock 300 is preferably a rotary airlock 300, and is preferably oriented with the rotational axis substantially parallel to the broad face of the pallet. The hopper 200 can additionally include a material transporter that moves carbonaceous material from the hopper base 210 to the airlock 300. The hopper material transporter preferably traces the profile of the hopper base 210, but can alternatively be at an angle relative to the hopper base 210. The power generation system 10 can additionally include a filtration module 700 located in the fourth corner, wherein the filtration system is preferably mounted to the pallet. However, the pyrolysis-reactor assembly and filtration module corners can be switched. The power generation system 10 can additionally include a particulate separator 600 located between the filtration module 700 and the alternator 850, near the center of the pallet footprint. The particulate separator 600 can include a cyclone module and heat-radiating features, such as fins, but can alternatively be any suitable particulate separator 600. The particulate separator 600 is preferably located below the drying module 400 (e.g., such that the particulate separator 600 is located between the drying module 400 and the pallet). The particulate separator 600 can be directly below the drying module 400 (e.g., share a common vector normal to the pallet broad face), offset from the drying module 400, located below a portion of the hopper 200, or arranged in any other suitable location. The particulate separator 600 is preferably mounted to the reactor module 550 (e.g., about the reactor module outlet), but can alternatively be mounted to any suitable generator component. This arrangement preferably additionally minimizes the amount and/or length of interconnects by reducing the length of the plumbing runs and arranging the output exhaust pipe of the engine 810 is preferably arranged proximal to the pyrolysis module inlet. Furthermore, the electrical controls and instrumentation are preferably arranged on a single conduit 20 (e.g., wiring conduit including electrical wiring and/or fluid channeling) extending along the center of shipping pallet, in between the reactor module 550 and the engine module 810. Power and signal connections from the gasifier and engine modules are preferably designed to face inward, toward the single distribution conduit 20, for easy connection and minimal wiring. However, the power generation system 10 can include any suitable number of conduits. The conduit preferably extends through the center of the system, wherein the conduit preferably extends parallel to a broad face of the pallet, but can alternatively extend perpendicular to the broad face of the pallet (e.g., vertically). The conduit preferably additionally includes a user control module 25 (e.g., arranged along or proximal an edge between the filtration module 700 and the engine module 800), but can alternatively include any other suitable user input interface. This arrangement preferably additionally enables single-side operation by arranging all the electrical controls and plumbing valves along a single side.

The power generation system 10 preferably includes a first heat exchanger 420 fluidly coupled to the third heat exchanger 560 (and thus, the outlet of the reactor module 550) and thermally coupled to the drying module 400, wherein the first heat exchanger 420 heats the carbonaceous material with waste heat from the gaseous fuel. More preferably, the inlet of the first heat exchanger 420 is fluidly coupled to the particulate separator 600. The outlet of the first heat exchanger 420 is preferably fluidly connected to the filtration module 700 but can alternatively be directly connected to the carburetor of the engine. The first heat exchanger 420 is preferably an annular channel surrounding the drying module 400, but can be any suitable heat exchanger. The power generation system 10 preferably includes a second heat exchanger 520 fluidly coupled to the engine exhaust and thermally coupled to the pyrolysis module 510, wherein the second heat exchanger 520 heats the dried carbonaceous material with waste heat from the exhaust gas. The outlet of the second heat exchanger 520 is preferably coupled to the ambient environment. The second heat exchanger 520 is preferably an annular channel surrounding the pyrolysis module 510, but can be any suitable heat exchanger. The power generation system 10 preferably includes a third heat exchanger 560 fluidly coupled to the outlet of the reactor module 550 and thermally coupled to an air intake for the reactor module 550, wherein the third heat exchanger 560 heats the air used for combustion. More preferably, the third heat exchanger 560 receives hot gaseous fuel from the reactor module outlet and egresses gaseous fuel into the particulate separator boo. The third heat exchanger 560 is preferably an annular channel surrounding the reactor module 550, but can be any suitable heat exchanger.

However, the power generation system components can be otherwise arranged within the pallet footprint.

3. Second Specific Example—Configuration for a Shipping Container Enclosure

Figure 4A:
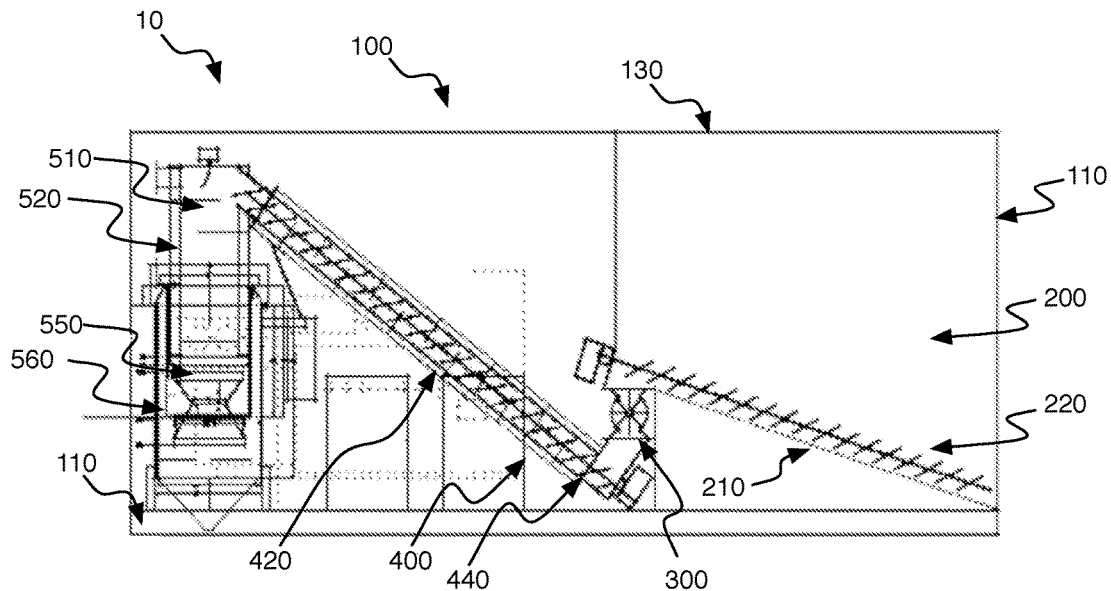
FIGS. 4A and 4B are a side and top view of a second variation of the power generation system, respectively.
Figure 4B:
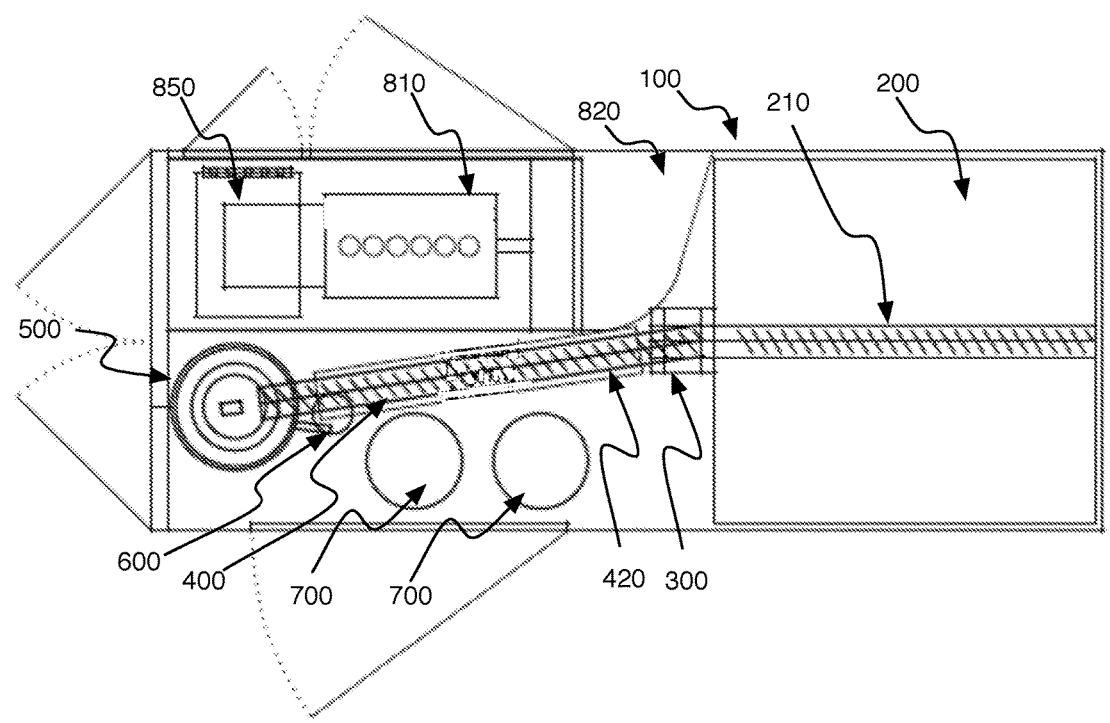

In a second specific example of the power generation system 10, as shown in FIGS. 4A and 4B, the power generation system 10 is configured to fit within a standard intermodal shipping container enclosure. The power generation system 10 can be arranged within a 20 foot intermodal container, a 40 foot intermodal container, a 40 foot high cube container, a 45 foot high cube container, or any other suitable shipping container. The shipping container enclosure preferably includes a rectangular skid 110, four walls extending perpendicularly from the skid 110, and a top 130 statically connected to the ends of the four walls distal the skid 110. The shipping container enclosure preferably has a first and a second end perpendicular the enclosure longitudinal axis (e.g., the short sides of the shipping enclosure). The enclosure is preferably divided along its length (longitudinal axis) into a enclosure side occupying the first end and a hopper side occupying the second end, wherein the hopper 200 is located in the hopper side and preferably occupies the entire second end of the enclosure. The hopper 200 preferably occupies substantially half of the enclosure, but can alternatively occupy more or less of the enclosure. The hopper 200 is preferably cooperatively defined by an auxiliary wall and three adjacent walls of the enclosure, and can additionally be defined by the top and/or base. The hopper 200 is preferably an open hopper (e.g., open to ambient environment), but can be any suitable hopper. The hopper 200 preferably has an angled bottom relative to the skid 110, wherein the hopper base 210 preferably has a first end and a second end. The first end of the hopper base 210 is preferably the short edge of the skid 110, and the second end of the hopper is preferably proximal the center of the skid 110, wherein the distance between the hopper base 210 and the skid 110 preferably increases with proximity to the center of the skid 110 (e.g., the second end of the hopper base 210 is further away from the skid 110 than the first end of the hopper base 210). The hopper base 210 is preferably substantially planar, but can alternatively be curved or have any suitable geometry. The hopper base 210 preferably meets the skid 110 along the short edge of the second end of the enclosure, but can alternatively meet the skid 110 along a longitudinal wall. The hopper 200 preferably additionally includes a material transporter that functions to move carbonaceous material from the hopper base 210 toward the enclosure center. The material transporter preferably moves carbonaceous material in a vector substantially parallel to the hopper base 210, but can alternatively move carbonaceous material in a vector at an angle to the hopper base 210. The hopper base 210 is preferably porous (e.g., perforated, formed from a mesh, etc.), but can alternatively be solid. The walls and/or top 130 defining the hopper base 210 are preferably solid, but can alternatively be porous or articulate relative to the skid 110 (e.g., have doors). The hopper base 210 and auxiliary wall are preferably substantially thermally conductive and made of metal, but can alternatively be made of any suitable material.

The remainder of the generator components are preferably located in the component side, wherein the first end includes a first and a second corner. The pyrolysis module 510 and reactor module 550 are preferably located in the first corner, wherein the pyrolysis module 510 is preferably coaxially arranged above the reactor module 550 (e.g., such that the reactor module 550 is located between the pyrolysis module 510 and the skid 110). The reactor module 550 is preferably mounted to the skid 110, while the pyrolysis module 510 is preferably mounted to the reactor module 550 end distal the skid 110 (opposing end). The engine module 800 is preferably located in the second corner, arranged with the engine 810, drive mechanism, or alternator longitudinal axis parallel to the footprint longitudinal axis. The engine module 800 is preferably arranged with the alternator 850 in the second corner and the engine module 800 between the hopper 200 and the alternator 850. The engine module 800 is preferably arranged with a control panel and/or power interface proximal a longitudinal edge of the enclosure, but can alternatively be arranged with the control panel and/or power interface proximal a lateral edge of the enclosure. The engine module 800 can be arranged with the engine radiator proximal the hopper auxiliary wall, wherein the radiator blast can ingress into the hopper and pre-heat and pre-dry the carbonaceous material within the hopper 200. The radiator blast is preferably directed into the hopper 200, but the hot air from the radiator 820 can alternatively be fed to the hopper 200 through a pipe or any suitable mechanism. However, the engine module 800 can be otherwise arranged within the enclosure 100. The engine module 800 and the alternator 850 are preferably mounted directly to the skid 110. The filtration modules are preferably located along a longitudinal edge shared with the pyrolysis/reactor modules 550, between the gasifier 500 and the hopper 200. The filtration modules are preferably mounted directly to the skid 110. The drying module 400 preferably extends from the bottom of the hopper 200 to the top of the pyrolysis module 510 along a longitudinal portion of the enclosure. The drying module 400 preferably has a first and a second end, wherein the first end of the drying module 400 is preferably located below the second end of the hopper base 210 (e.g., between the second end of the hopper base 210 and the skid 110), and the second end of the drying module 400 is preferably fluidly connected to the pyrolysis module 510 distal the skid 110. The drying module 400 preferably includes a channel encapsulating a material transporter, more preferably includes a channel surrounding a heated auger. The drying module 400 can be mounted to the hopper base 210, hopper auxiliary wall, or airlock 300 casing at the first end, and mounted to the pyrolysis inlet at the second end. The airlock 300 is preferably located between the second end of the hopper base 210 and the first end of the drying module 400, and preferably forms a substantially fluid impermeable seal with the drying module 400. The airlock 300 is preferably a rotary airlock 300 and oriented with the rotational axis substantially parallel the skid broad face, but any other type of air lock mechanism can be used. The end material transporter of the hopper 200 preferably extends over the airlock-hopper junction, such that carbonaceous material is dropped into the airlock 300. The airlock 300 is preferably mounted to the hopper auxiliary wall and hopper base 210. The particulate separator 600 can be located proximal the center of the enclosure 100. Alternatively, the particulate separator 600 can be located between the engine 810 and the auxiliary wall of the hopper 200, wherein the heat exchanger preferably heats and/or dries the carbonaceous material within the hopper 200 with waste heat extracted from the gaseous fuel. The outlet of the particulate separator 600, more preferably the entirety of the particulate separator 600, is preferably located below the inlet of the first heat exchanger 420 (e.g., between the first heat exchanger inlet and the skid 110), but can alternatively be located elsewhere. The particulate separator 600 is preferably mounted to the outlet of the third heat exchanger 560, but can alternatively be mounted to any suitable component of the power generation system 10. The enclosure 100 preferably has doors along the walls defining the enclosure first end, such that the generator components can be accessed.

The power generation system 10 preferably includes a first heat exchanger 420 fluidly coupled to the third heat exchanger 560 (and thus, the outlet of the reactor module 550) and thermally coupled to the drying module 400, wherein the first heat exchanger 420 heats the carbonaceous material with waste heat from the gaseous fuel. More preferably, the inlet of the first heat exchanger 420 is fluidly coupled to the particulate separator 600. The outlet of the first heat exchanger 420 is preferably fluidly connected to the filtration module 700 but can alternatively be directly connected to the carburetor of the engine. The first heat exchanger 420 is preferably an annular channel surrounding the drying module 400 (e.g., extending along the longitudinal axis of the drying module 400), but can be any suitable heat exchanger. The inlet of the first heat exchanger 420 is preferably proximal to the first end of the drying module 400 and the outlet of the first heat exchanger 420 proximal the second end of the drying module 400. Alternatively, the outlet of the first heat exchanger 420 is proximal to the first end of the drying module 400 and the inlet of the first heat exchanger 420 is proximal the second end of the drying module 400. Alternatively, the first heat exchanger 420 includes two fluid channels with opposing flow directions that are fluidly connected at one end, wherein the inlet and outlet of the first heat exchanger 420 can be located proximal the pyrolysis module 510 or the hopper 200. The power generation system 10 preferably includes a second heat exchanger 520 fluidly coupled to the engine exhaust and thermally coupled to the pyrolysis module 510, wherein the second heat exchanger 520 heats the dried carbonaceous material with waste heat from the exhaust gas. The outlet of the second heat exchanger 520 is preferably coupled to the ambient environment. The second heat exchanger 520 is preferably an annular channel surrounding the pyrolysis module 510, but can be any suitable heat exchanger. The power generation system 10 preferably includes a third heat exchanger 560 fluidly coupled to the outlet of the reactor module 550 and thermally coupled to an air intake for the reactor module 550, wherein the third heat exchanger 560 heats the air used for combustion. More preferably, the third heat exchanger 560 receives hot gaseous fuel from the reactor module outlet and egresses gaseous fuel into the particulate separator 600. The third heat exchanger 560 is preferably an annular channel surrounding the reactor module 550, but can be any suitable heat exchanger.

However, the generator components can be otherwise arranged in a standardized shipping container enclosure. Alternatively, any suitable arrangement of the modules can be used.

As a person skilled in the art will recognize from the previous detailed description and from the figures and claims, modifications and changes can be made to the preferred embodiments of the invention without departing from the scope of this invention defined in the following claims.

We claim:

1. A gasification based power generation system that converts carbonaceous material into electrical power, comprising:
    an open-air hopper;
    an airlock connected to an outlet of the hopper;
    a drying module connected to the airlock, the airlock configured to form a substantially fluid impermeable seal with the drying module;
    a gasifier comprising: a pyrolysis module and a reactor module, the pyrolysis module connected to the drying module and to the reactor module;
    an engine module configured to generate electrical power, the engine module comprising an engine; and
    a heat exchange module comprising:
        a first heat exchanger fluidly connected to an outlet of the reactor module and thermally connected to the drying module;
        a second heat exchanger fluidly connected to an outlet of the engine and thermally connected to the pyrolysis module; and
        a third heat exchanger fluidly connected between the outlet of the reactor module and the first heat exchanger, the third heat exchanger thermally connected to an air inlet of the reactor module.

2. The system of claim 1, wherein the airlock comprises a rotary airlock.

3. The system of claim 2, wherein the airlock is oriented with a rotational axis substantially normal to a central axis of the hopper.

4. The system of claim 3, wherein the airlock is located in a bottom of the hopper, the bottom of the hopper substantially normal to the central axis of the hopper.

5. The system of claim 1, wherein the hopper comprises a collapsible hopper.

6. The system of claim 1, wherein the heat exchange module is thermally coupled to the hopper.

7. The system of claim 6, wherein the heat exchange module further comprises a fluid manifold fluidly connected between the outlet of the engine and the second heat exchanger, the fluid manifold thermally coupled to the hopper.

8. The system of claim 7, wherein the hopper comprises a porous wall proximal a sidewall of the fluid manifold.

9. The system of claim 1, wherein the engine comprises a crankshaft and the engine module further comprises an alternator mechanically coupled to the crankshaft.

10. A gasification based power generation system that converts carbonaceous material into electrical power, comprising:
    a shipping pallet comprising a first corner and a second corner;
    a collapsible hopper;
    a drying module connected to an outlet of the hopper;
    a pyrolysis module arranged between the drying module and the pallet;
    a reactor module, located in the first corner, coaxially aligned with the pyrolysis module and arranged between the pyrolysis module and the pallet; and
    an engine module comprising an in-line alternator and engine system located in the second corner, the engine system comprising a fuel inlet fluidly coupled to the reactor module.

11. The system of claim 10, further comprising an airlock connecting the outlet of the hopper to the drying module, the airlock configured to form a substantially fluid impermeable seal with the drying module.

12. The system of claim 11, the airlock comprising a rotary airlock.

13. The system of claim 10, wherein:
    the drying module is arranged between the pallet and the hopper; and
    the pyrolysis module is offset from the drying module.

14. The system of claim 13, wherein the shipping pallet is a North American standard pallet.

15. The system of claim 10, further comprising a first heat exchanger fluidly coupled to an outlet of the reactor module and thermally coupled to the drying module.

16. The system of claim 15, further comprising a third heat exchanger fluidly coupling the outlet of the reactor module to the first heat exchanger, the third heat exchanger thermally connected to an air inlet of the reactor module.

17. The system of claim 10, further comprising a second heat exchanger fluidly coupled to an exhaust of the engine module and thermally coupled to the pyrolysis module.

18. The system of claim 17, further comprising a pipe fluidly connecting the exhaust of the engine module and the second heat exchanger, the pipe arranged between the pallet and the hopper and thermally coupled to the hopper.

19. The system of claim 10, further comprising a filtration module, wherein:
    an outlet of the reactor module is fluidly coupled to an inlet of the filtration module; and
    an outlet of the filtration module is fluidly coupled to the fuel inlet of the engine module.

20. The system of claim 10, wherein the drying module is arranged between the hopper and the pallet and the hopper comprises:
    a substantially flat bottom arranged proximal to the pallet; and
    a full bottom feeder configured to move carbonaceous material to the outlet of the hopper.

* * * * *